US011665792B2

(12) United States Patent
Henrici et al.

(10) Patent No.: US 11,665,792 B2
(45) Date of Patent: May 30, 2023

(54) MICROWAVE OVEN WITH ADAPTED LED LIGHT (71) Applicant: BJB GmbH & Co. KG, Arnsberg (DE)

(72) Inventors: Philipp Henrici, Arnsberg (DE); Olaf Baumeister, Sundern (DE); Frank Welslau, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 17/531,729

(22) Filed: Nov. 20, 2021

(65) Prior Publication Data

US 2022/0240355 A1 Jul. 28, 2022

(30) Foreign Application Priority Data

Jan. 26, 2021 (DE) .......................... 102021101700.9

(51) Int. Cl.
*H05B 6/64* (2006.01)
*F21V 33/00* (2006.01)
*F21V 8/00* (2006.01)
*H05B 6/76* (2006.01)
*F21Y 115/10* (2016.01)

(52) U.S. Cl.
CPC ....... *H05B 6/6444* (2013.01); *F21V 33/0044* (2013.01); *G02B 6/0008* (2013.01); *H05B 6/76* (2013.01); *F21Y 2115/10* (2016.08)

(58) Field of Classification Search
CPC ..... H05B 6/6444; H05B 6/76; F21V 33/0044; G02B 6/0008
See application file for complete search history.

(56) References Cited

U.S. PATENT DOCUMENTS

| 4,559,585 A * | 12/1985 | Almgren ............... F24C 15/008 |
| | | 219/758 |
| 7,422,341 B2 | 9/2008 | Henrici et al. |
| 10,655,863 B1 * | 5/2020 | Signorino ............. F24C 15/008 |
| 2005/0259931 A1 * | 11/2005 | Gaydoul ............... G02B 6/0006 |
| | | 385/116 |

(Continued)

FOREIGN PATENT DOCUMENTS

| CN | 209932464 | 1/2020 |
| DE | 2937499 B1 | 5/1980 |

(Continued)

*Primary Examiner* — Jong-Suk (James) Lee
*Assistant Examiner* — Christopher E Dunay
(74) *Attorney, Agent, or Firm* — Von Rohrscheidt Patents (57) ABSTRACT A microwave oven including a cooking cavity that is enveloped by a cooking cavity wall; a cooking appliance light; an opening in the cooking cavity wall which supports the cooking appliance light; a shielding sleeve arranged in the opening and configured to prevent an exit of microwaves through the opening out of the cooking cavity, wherein the cooking appliance light includes a LED illuminant and a light conductor rod which conducts light emitted by the LED illuminant into the cooking cavity, wherein the cooking appliance light includes a mounting plate that includes a cut out in which the light conductor rod of the cooking appliance light is supported, wherein the mounting plate supports the shielding sleeve that envelops the light conductor rod, and wherein the mounting plate is arranged at the cooking cavity wall and covers the opening.

6 Claims, 6 Drawing Sheets (56) References Cited

U.S. PATENT DOCUMENTS

| | | | |
|---|---|---|---|
| 2006/0027574 A1* | 2/2006 | Cho | H05B 6/6444 |
| | | | 219/758 |
| 2016/0258616 A1* | 9/2016 | Brabec | F21K 9/00 |
| 2018/0066850 A1* | 3/2018 | Baumeister | F24C 15/008 |

FOREIGN PATENT DOCUMENTS

| | | |
|---|---|---|
| DE | 8809668 U1 | 11/1988 |
| DE | 202006001187 | 4/2006 |
| DE | 102014203532 A1 | 8/2015 |
| DE | 202019106167 U1 | 11/2019 |
| DE | 202019106170 U1 | 11/2019 |
| WO | WO2020/043359 A1 | 3/2020 |

* cited by examiner

MICROWAVE OVEN WITH ADAPTED LED LIGHT

RELATED APPLICATIONS

This application claims priority from and incorporates by reference German Patent Application DE 10 2021 101 700.9 filed on Jan. 26, 2021.

FIELD OF THE INVENTION

The invention relates to a microwave oven.

BACKGROUND OF THE INVENTION

Cooking appliances are known in the art configured as ovens, steam cookers, microwave ovens or other devices for home use and commercial use. They are used for preparing foods and include a cooking cavity that is formed by a so-called muffle and its walls, thus the muffle walls or the cooking cavity walls.

In order to be able to watch and assess the cooking process, cooking appliances include lighting as described e.g. in DE 50 2006 001 187 owned by applicant. Lights of this type are arranged in pass through openings of the cooking cavity wall that are introduced into the cooking cavity wall during fabrication of the muffle.

The muffle is typically made from plural metal components. Muffle elements are stamped from sheet metal.

Tools and equipment for fabricating muffle elements are quite expensive so that manufacturing of cooking appliances strive to sufficiently load the tooling by using the same muffle in various types and models of appliances.

Recent developments in illumination technology have led to an increased use of cooking cavity lights that are based on LED modules that provide high energy saving potential and thus improve energy efficiency of cooking appliances. However specific requirements of LED lighting technology led to new cooking cavity lights that have different configurations, installation dimensions and arrangement requirements in the cooking appliance. In particular temperature sensitivity of the LED light source has the effect that the LED light source has to be arranged at a significantly larger distance from the cooking cavity and that the emitted light is typically conducted into the cooking cavity through a light conductor. This has the effect that oven muffles with accordingly configured wall openings are developed for using LED based cooking appliance lights for conducting the light into the cooking cavity and existing production tooling has to be adapted or replaced. This is detrimental from an economic and environmental point of view.

BRIEF SUMMARY OF THE INVENTION

Thus, it is an object of the invention to provide a microwave oven with a LED based cooking cavity light using an opening in the cooking cavity wall that is configured for conventional lights.

The object is achieved by a microwave oven including a cooking cavity that is enveloped by a cooking cavity wall; a cooking appliance light; an opening in the cooking cavity wall which supports the cooking appliance light; a shielding sleeve arranged in the opening and configured to prevent an exit of microwaves through the opening out of the cooking cavity, wherein the cooking appliance light includes a LED illuminant and a light conductor rod which conducts light emitted by the LED illuminant into the cooking cavity, wherein the cooking appliance light includes a mounting plate that includes a cut out in which the light conductor rod of the cooking appliance light is supported, wherein the mounting plate supports the shielding sleeve that envelops the light conductor rod, and wherein the mounting plate is arranged at the cooking cavity wall and covers the opening.

Thus, the opening in the cooking cavity wall has a first opening dimension, the cut out of the mounting plate has a second dimension which is smaller than the first opening dimension.

The invention is characterized in particular by the mounting plate described supra which adapts the mounting contour and mounting position defined by the opening in the cooking cavity wall for using an LED illuminant. This way neither the cooking cavity wall which is part of the muffle has to be adapted to modern LED based cooking appliance lights nor efforts have to be made to redesign cooking appliance lights which have been developed to use advantageous LED technology so that the LED cooking appliance lights are adapted to existing cooking appliance walls that are still configured for conventional lights.

Thus, the mounting plate according to the invention facilitates a continued use of production tooling that is configured for producing components for conventional illumination until tooling has to be acquired e.g; due to wear which goes hand in hand with a change in tooling. Simultaneously illuminants adapted to new requirements can be used without redesign, thus the mounting plate facilitates a seamless and soft transition from conventional technology to new technology.

Thus, the sleeve enveloping the light conductor rod prevents an exit of microwave radiation from the cooking cavity and thus functions as a microwave trap.

The mounting plate can be attached in several ways to close the cooking cavity wall. Thus, a threaded connection is feasible as well as a clamped or interlocked connection. The type of mounting is typically similar to the type of mounting that was used for the conventional cooking appliance light that was used in the opening so far. Typically, these are interlocking lugs that slide at opening edges during penetration or insertion through the opening and that are elastically deformed so that they deflect outward again after moving through the opening and which receive the cooking cavity wall between themselves and the mounting plate, thus which reach behind the cooking cavity wall.

In a particularly advantageous embodiment, the sleeve element is configured as a separate component and includes in particular an attachment flange and an angled attachment base.

Configuring the sleeve element as a separate component advantageously creates a modular system. Thus, the same sleeve element can be used for an arrangement on different mounting plates that are adapted to the opening in the cooking cavity wall that is adapted to the conventional illuminants. Additionally different materials can be used for producing the mounting plate and the sleeve element. Last not least, the dimensions of the sleeve element can be adapted to the shielding of the microwave radiation which is hardly possible when reforming sections of the mounting plate.

In an advantageous embodiment the mounting plate is made from one piece of sheet metal.

Last not least the mounting plate forms a receiving slot wherein the mounting base of the sleeve element is run through the receiving slot and reaches behind the mounting plate on a side that is oriented away from the contact flange.

The mounting base facilitates simple fixing of the sleeve element at the support plate in particular when an additional attachment device is provided which fixes the sleeve element at the mounting pirate in combination with the mounting base. Interlocking elements are particularly suitable for this purpose that penetrate into corresponding interlocking openings of the mounting plate. A riveted connection as well as a screw connection are feasible as well.

Between the sleeve element and the light conductor rod there is an annular gap for mounting purposes and to compensate for different thermal expansion coefficients. In order to prevent cooking vapors from exiting from the cooking cavity along the annular gap between light conductor rod and sleeve element either the mounting plate or the sleeve element itself is provided with a seal element that closes the annular gap. Additionally, the seal element can also support the cooking appliance light at the cooking cavity wall, in particular when the seat element is not elastic like e.g. a graphite ring encased in a ceramic support. However, it is also possible to provide a support of this type with an accordingly configured elastomeric seal element.

The sleeve element can include a sleeve wall with a cut out, thus can be configured as a perforated plate or a mesh tube while performing its microwave trap function.

BRIEF DESCRIPTION OF THE DRAWINGS

Further advantages and a better comprehension of the invention can be derived from a subsequent description with reference to drawing figures, wherein.

DETAILED DESCRIPTION OF THE INVENTION

The drawing figures show an arrangement of the cooking appliance light 12 in a section of the cooking cavity wall 11 that is designated over all with the reference numeral 10.

Figure 1:
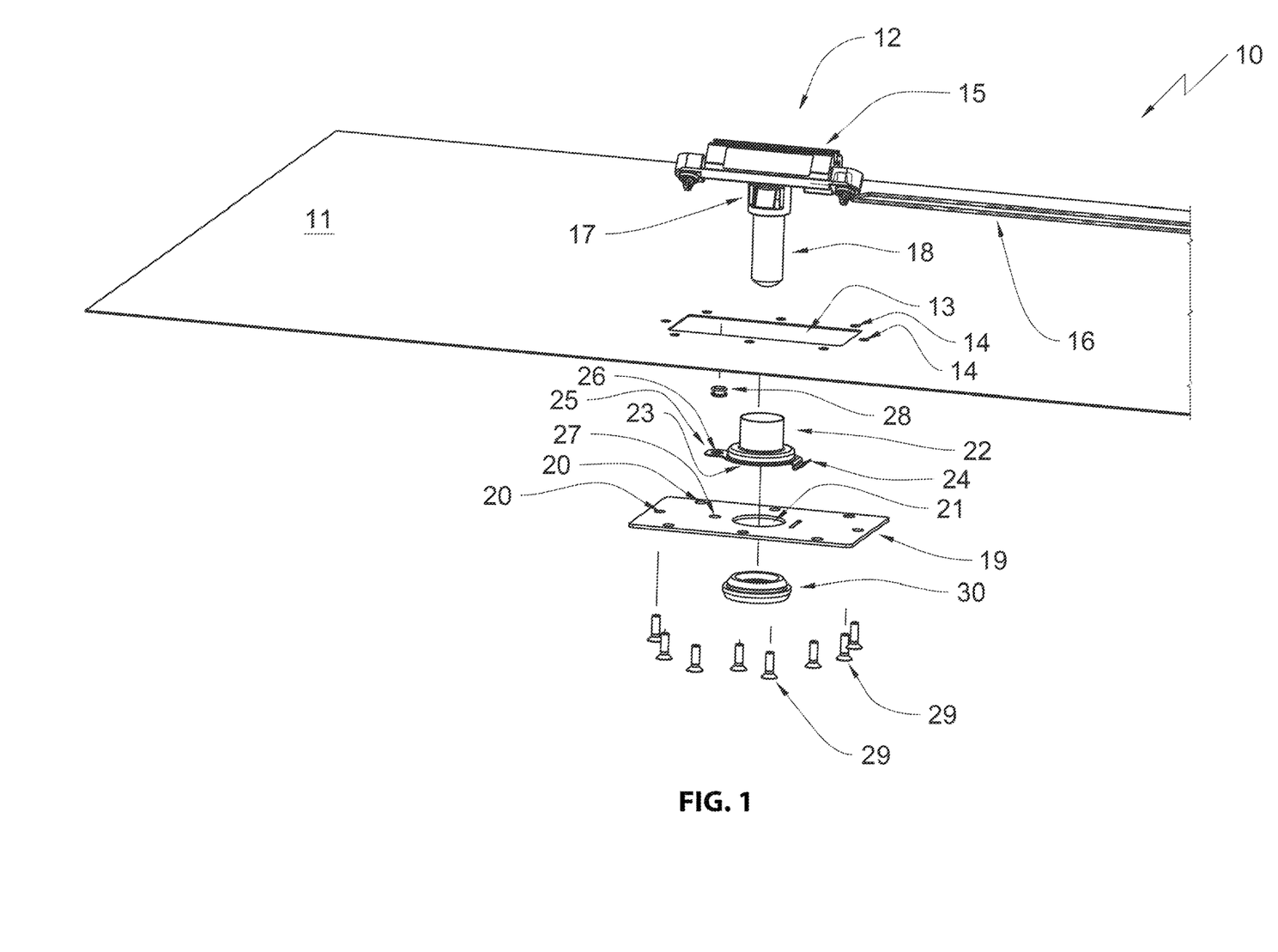
FIG. 1 illustrates the arrangement according to the invention of a cooking appliance light in the partially illustrated cooking cavity wall of a microwave oven in an exploded view.

FIG. 1 illustrates the arrangement 10 in an exploded view. The cooking cavity wall 11 includes an opening 13 that is configured for a known cooking cavity light using reflectors and e.g. halogen lamps, wherein threaded bore holes 14 are arranged about the opening 13.

A cooking cavity light designated overall with the reference numeral 12 includes a socket 15 which supports a LED illuminant, is connected with hook up conductors 16 and forms a retaining collar 17 configured to attach a light conductor rod 18.

A mounting plate 19 is provided with pass through bore holes 20 and sized so that it covers the opening 13 of the cooking cavity wall 11. Thus, the pass through bore holes 20 of the mounting plate 19 are aligned with the threaded bore holes 14 of the cooking cavity wall 11.

The mounting plate 19 includes a recess 21 that is configured to pass the light conductor rod 18 through and that receives an elastomeric material seal 30. Then a sleeve element 22 is arranged on a side of the mounting plate 19 that is oriented away from the cooking cavity wherein the sleeve element is configured to receive the light conductor rod.

The sleeve element 22 includes a contact flange 23 at an end that is oriented towards the mounting plate 19 wherein the contact flange includes a mounting base 24 and a support lug 25 that is arranged diametrically opposed to the mounting base 24. The support lug 25 includes a first rivet bore hole 26 that is aligned with a second rivet bore hole 27 in the mounting plate. The rivet bore holes 26, 27 can be penetrated by an attachment rivet 28 in order to fix the sleeve element 22 at the mounting plate 19.

Attachment bolts 29 run through the pass-through bore holes 20 of the mounting plate 19 and engage the threaded bore holes 14 of the cooking cavity wall 11 in order to attach the mounting plate 19 at the cooking cavity wall 11.

Figure 2:
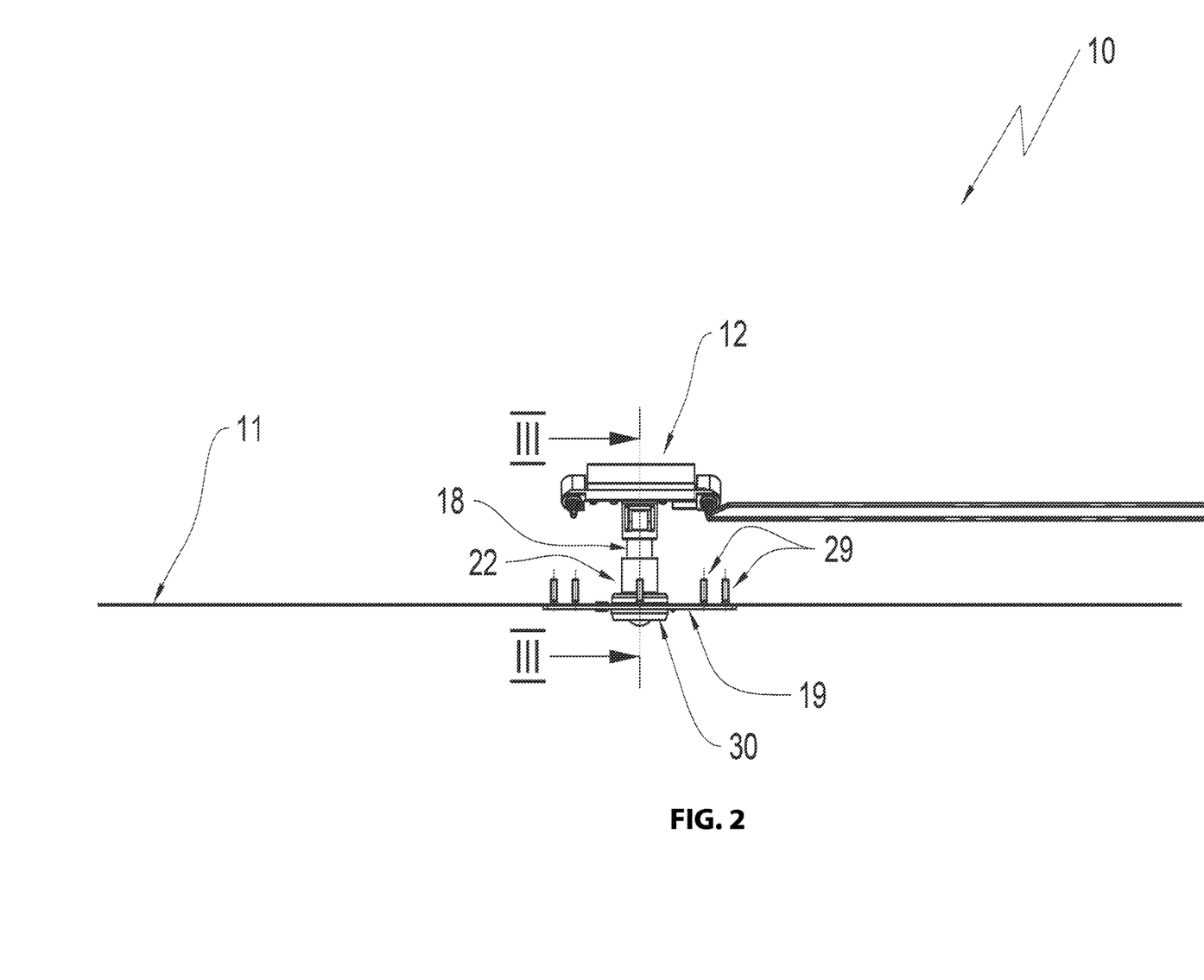
FIG 2 illustrates the arrangement according to FIG. 1 in assembled condition in a side view.

This is evident in particular from FIG 2 which shows a side view of the arrangement 10 with the components assembled that are illustrated in FIG. 1 in an exploded view.

Figure 3:
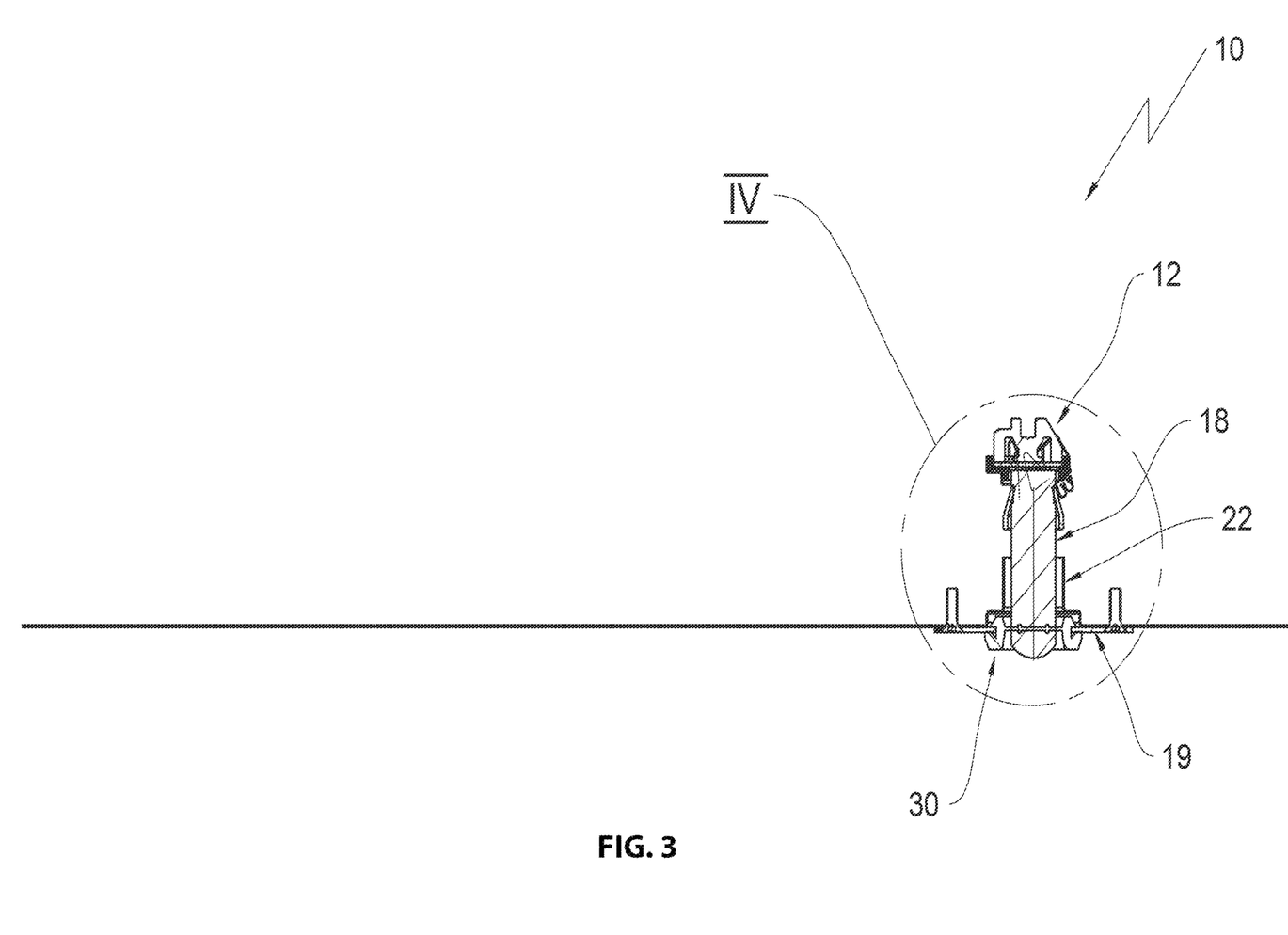
FIG. 3 illustrates a sectional view according to the sectional line III-III in FIG. 2.
Figure 4:
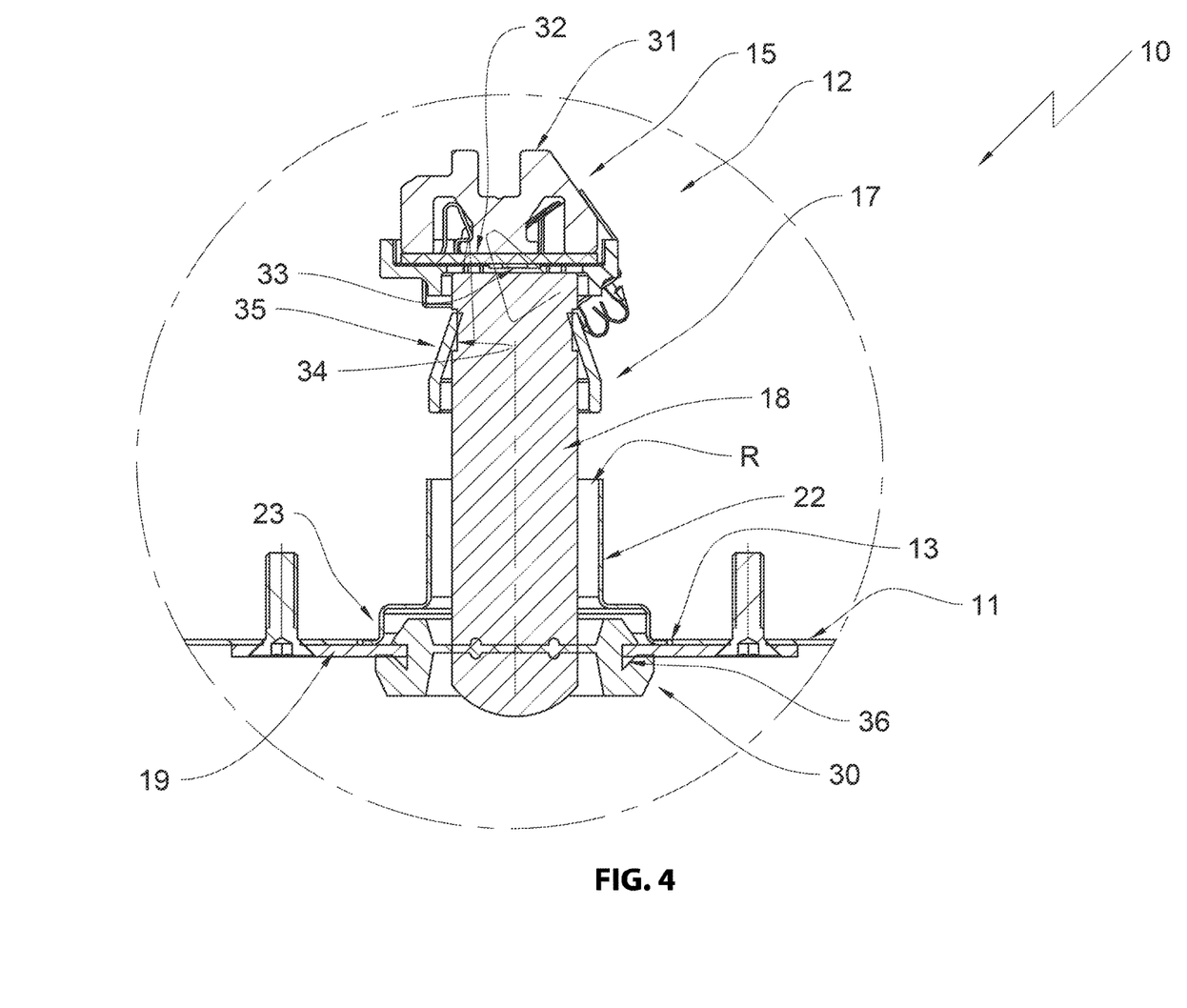
FIG. 4 illustrates a blown-up view of the detail circle IV in FIG. 3.

FIG. 4 illustrates the arrangement 10 in assembled condition showing a blown-up view of the detail circle IV in FIG. 3. FIG. 3 shows a sectional view along the sectional line III-III in FIG. 2.

It is evident from FIG. 4 that the socket element 15 includes a cooling body 31 which supports a circuit board 32 that is provided with a LED module 33 which forms the light source of the cooking appliance light 12 wherein the light conductor rod 18 is arranged downstream of the light 12 in light exit direction. Thus, the light conductor rod can receive the light emitted by the LED module 33 and feed it to the cooking cavity.

The light conductor rod 18 includes an interlocking groove 34 proximal to its LED module side end wherein interlocking lugs 35 engage the interlocking groove 34 and are formed by the support collar 17.

The light conductor rod 18 sits in the elastomeric seal 30. The light conductor rod 18 is furthermore arranged in the opening 13 of the cooking cavity wall 11. Thus, it is appreciated that the opening 13 in the instant representation is only visible as a small gap between the cooking cavity wall 11 and the sleeve element 22 which is caused by the selected sectional plane.

The elastomeric seal 30 seals the annular gap R between the sleeve element and the light conductor rod 18 against an exit of cooking vapors from the cooking cavity. In the illustrated embodiment the elastomeric seal 30 engages edge portions of the recess 21 of the support plate 19 with a support groove 36. An arrangement of the elastomeric seal 30 at the sleeve element 22 is also feasible in an alternative embodiment.

FIG. 4 enables a person skilled in the art to use comparatively inflexible seals configured e.g. as a graphite ring that is attached at the sleeve element 22 at the support plate 19 and that has an axial extension that suffices for supporting the light conductor rod 18. A seal ring thus configured is capable not only to close the annular gap R but to overall support the cooking appliance light in its entirety so that the cooling appliance light 12 does not require any additional attachment at the cooking appliance.

Figure 5:
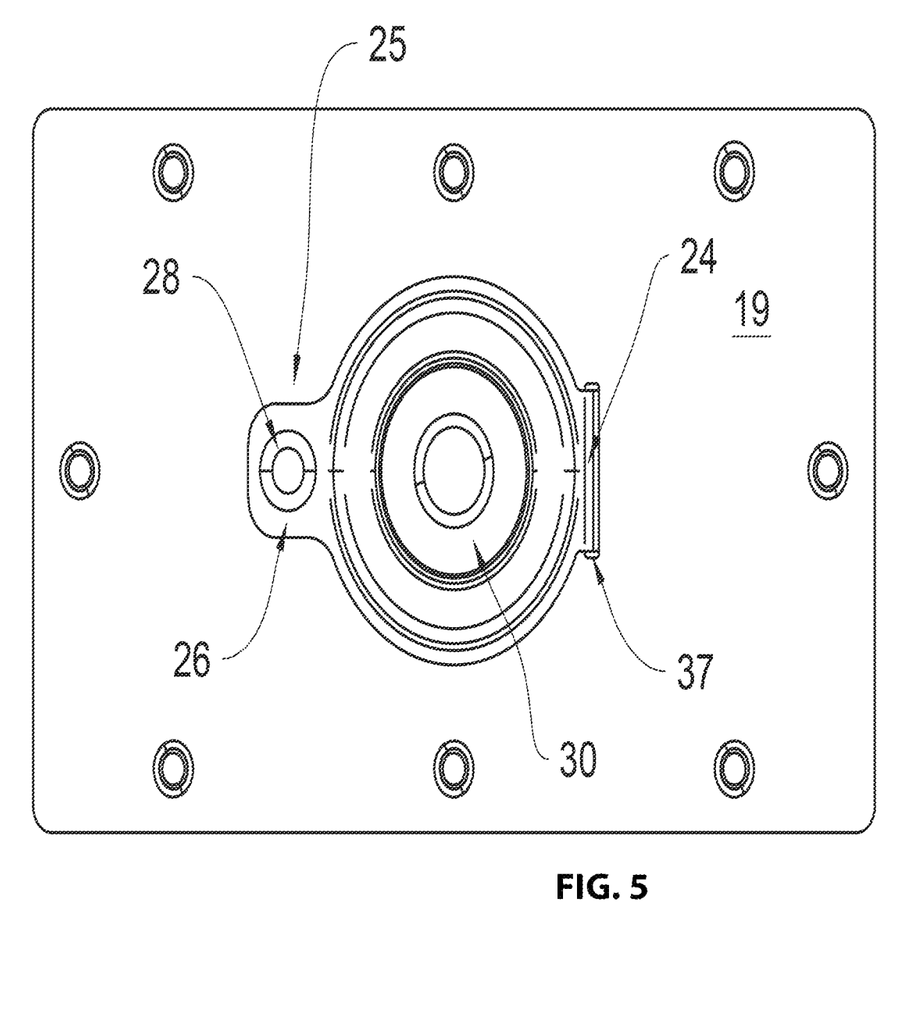
FIG. 5 illustrates a view of the mounting plate and the sleeve element looking at a side oriented away from the cooking cavity.
Figure 6:
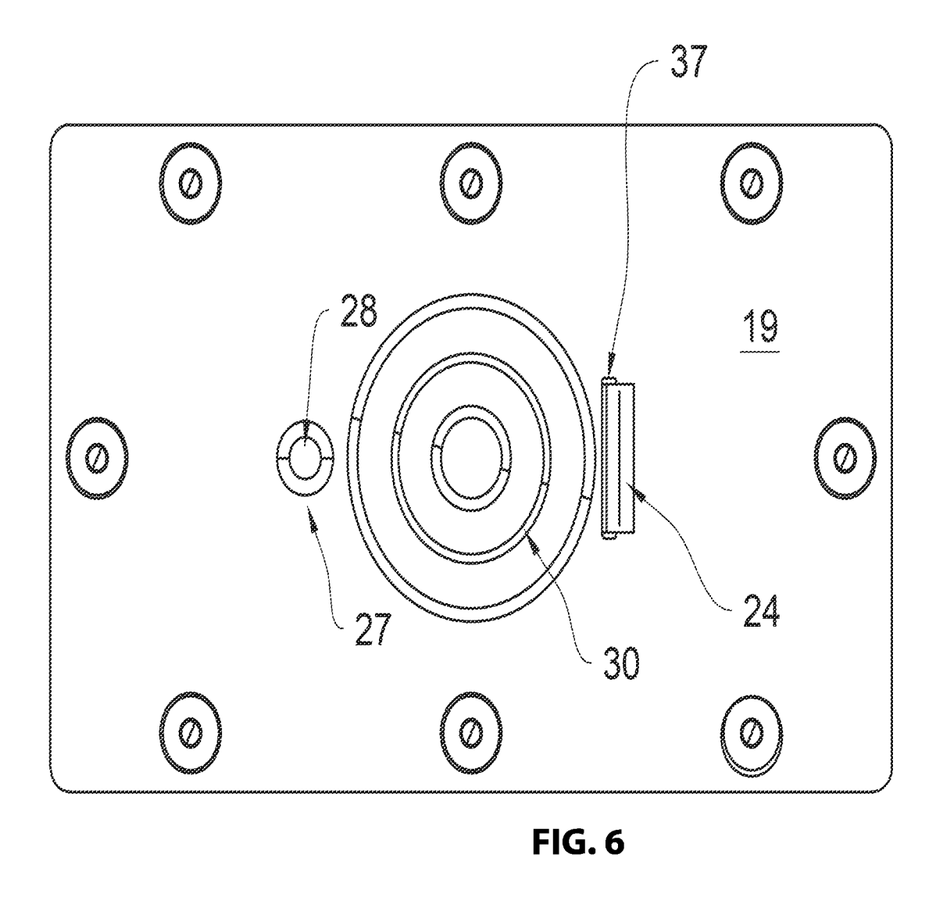
FIG. 6 illustrates a view of the support plate and the sleeve element looking at the side facing the cooking cavity.

The attachment of the sleeve element 22 at the support plate 19 is furthermore evident from FIGS. 5 and 6 which show the support plate from above (side oriented away from the cooking cavity. FIG. 5) and from below (side oriented towards the cooking cavity FIG. 6).

FIGS. 5 and 6 show that the mounting plate 19 is provided with an attachment slot 37 through which the mounting base 24 extends and exits on a side of the support plate 19 that is arranged opposite to the sleeve element 22 in the contact flange 23. The mounting base 24 of the sleeve element 22 contacts the mounting plate 19 with an end.

The support lug 25 of the sleeve element 22 is aligned with its first rivet bore hole 26 with the second rivet bore hole 27 of the mounting plate 19 wherein the attachment rivet 28 runs through both rivet bore holes 26, 27 so that the sleeve element 22 is reliably attached at the mounting plate 19 together with the mounting base 24. The elastomeric seal 30 is shown in FIGS. 5 and 6 but does not perform any function with fixing the sleeve element at the mounting plate 19.

The invention shows how a cooking cavity wall 11 with an opening 13 for fixing known cooking cavity sights including e.g. known halogen or incandescent bulbs can be provided with a cooking cavity light that is based on modern LED technology by using an adapted mounting plate 19. In particular cooking appliance lights 12 with a light conductor rod 18 only require small openings in the cooking cavity wall 11 for feeding the light info the cooking cavity. The mounting plate 19 reduces the diameter of the opening 13 accordingly to a dimension that is suitable for introducing the light conductor rod 18. Therefore, the mounting plate 19 is an adaptor plate which allows to use existing tooling for producing cooking cavities when using LED lights. The LED lights do not have to be adapted to the instant installation conditions.

Thus, it is a core idea of the invention to provide a suitable feed for the light conductor rod 18 by reducing a size of an oversize dimension of the opening 13 in the cooking cavity wall 11 by using in particular the mounting plate 19 for passing the light conductor rod 18 through.

The sleeve element 22 functions as a shield for microwave radiation which prevents an exit of the microwave radiation from the cooking cavity. The sleeve element 22 thus performs the function of known grid structures that are associated with the opening 13 of the cooking cavity wall 11 when classic cooking appliance lights are being used.

REFERENCE NUMERALS AND DESIGNATIONS 10 arrangement
11 cooking cavity wall
12 cooking appliance light, LED illuminant
13 opening
14 threaded bore hole
15 socket
16 connection conductor
17 support collar
18 light conductor rod
19 mounting plate
20 pass through bore hole
21 cutout
22 sleeve, shield
23 contact flange
24 mounting base
25 retaining lug
26 first rivet bore hole
27 second rivet bore hole
28 attachment rivet
29 mounting bolt
30 elastomeric seal
31 cooling body
32 circuit board
33 LED module
34 interlocking groove
35 interlocking lug
36 retaining groove
37 attachment slot
R annular gap

What is claimed is:

1. A microwave oven, comprising:
a cooking cavity that is enveloped by a cooking cavity wall;
a cooking appliance light;
an opening in the cooking cavity wall which supports the cooking appliance light;
a shielding sleeve arranged in the opening and configured to prevent an exit of microwaves through the opening out of the cooking cavity,
wherein the cooking appliance light includes a LED module and a light conductor rod which is not in contact with the LED module and which conducts light emitted by the LED module into the cooking cavity,
wherein the cooking appliance light includes a mounting plate that includes a cut out in which the light conductor rod of the cooking appliance light is supported,
wherein the mounting plate supports the shielding sleeve that envelops the light conductor rod,
wherein the mounting plate is arranged at the cooking cavity wall and covers the opening, and
wherein the light conductor rod is insertable into the cooking cavity through the cooking cavity wall, the shielding sleeve and the mounting plate when the shielding sleeve and the mounting plate are arranged at the cooking cavity wall.

2. The microwave oven according to claim 1, wherein the shielding sleeve is configured as an individual component and includes a contact flange and an angled mounting base.

3. The microwave oven according to claim 2,
wherein the mounting plate forms a receiving slot, and
wherein the mounting base of the sleeve runs through the receiving slot and reaches behind the mounting plate on a side that is oriented away from the contact flange.

4. The microwave oven according to claim 1, wherein the mounting plate supports a seal that closes an annular gap between the light conductor rod and the opening.

5. The microwave oven according to claim 1, wherein the shielding sleeve supports a seal that closes an annular gap between the sleeve and the light conductor rod.

6. The microwave oven according to claim 1, wherein the shielding sleeve includes cut outs in a sleeve wall and is configured as a mesh tube.

* * * * *